(12) United States Patent
Goncalves et al.

(10) Patent No.: US 9,447,923 B2
(45) Date of Patent: Sep. 20, 2016

(54) REPLACEABLE ASSEMBLY FOR A PRESSURIZED CONTAINER

(75) Inventors: Edson Goncalves, Sao Paulo (BR); Rafael Tardelli dos Santos Goncalves, Sao Paulo (BR)

(73) Assignee: Somma Technology Engenharia Ltda., Sao Paulo (BR)

( * ) Notice: Subject to any disclaimer, the term of this patent is extended or adjusted under 35 U.S.C. 154(b) by 14 days.

(21) Appl. No.: 14/128,970

(22) PCT Filed: Jun. 22, 2012

(86) PCT No.: PCT/BR2012/000215
§ 371 (c)(1),
(2), (4) Date: Mar. 19, 2014

(87) PCT Pub. No.: WO2012/174628
PCT Pub. Date: Dec. 27, 2012

(65) Prior Publication Data
US 2014/0217106 A1  Aug. 7, 2014

(30) Foreign Application Priority Data

Jun. 22, 2011 (BR) .................................... 1102874

(51) Int. Cl.
| | | |
|---|---|---|
| *B65D 25/32* | (2006.01) | |
| *F17C 13/00* | (2006.01) | |
| *F17C 13/08* | (2006.01) | |
| *F17C 1/00* | (2006.01) | |
| *H02K 1/26* | (2006.01) | |
| *H02K 15/02* | (2006.01) | |

(Continued)

(52) U.S. Cl.
CPC ............... *F17C 13/00* (2013.01); *F17C 1/00* (2013.01); *F17C 13/003* (2013.01); *F17C 13/005* (2013.01); *F17C 13/084* (2013.01); *H02K 1/265* (2013.01); *H02K 15/02* (2013.01); *F17C 2201/0109* (2013.01); *F17C 2201/032* (2013.01); *F17C 2201/058* (2013.01); *F17C 2203/066* (2013.01); *F17C 2203/0617* (2013.01); *F17C 2203/0639* (2013.01); *F17C 2205/018* (2013.01);

(Continued)

(58) Field of Classification Search
CPC ........................... B65D 25/32; B65D 25/2826
USPC ............ 220/756, 752, 759, 212.5, 582, 581, 220/647, 648, 649, 772; 248/346.01, 248/346.03, 346.5
See application file for complete search history.

(56) References Cited

U.S. PATENT DOCUMENTS

| | | | | |
|---|---|---|---|---|
| 3,297,351 A | * | 1/1967 | Hidding ............. | B65D 25/2826 294/33 |
| 4,690,299 A | * | 9/1987 | Cannon .................. | B65D 7/045 220/4.12 |

(Continued)

FOREIGN PATENT DOCUMENTS

| | | |
|---|---|---|
| DE | 29816750 U1 | 2/1999 |
| EP | 1744093 A2 | 1/2007 |

(Continued)

*Primary Examiner* — King M Chu
(74) *Attorney, Agent, or Firm* — The Webb Law Firm

(57) ABSTRACT

The present invention refers to replaceable upper or handle (2) and lower or support/base ring (4) elements for a pressurized container having an upper portion and a lower portion, wherein said upper and lower rings elements are manufactured from a thermostable material, a thermosetting material or a combination thereof, e.g. polyurethane, and comprise fastening means to releasably engage the ring elements with projections (3, 5) provided on the upper and lower portions of said pressurized container. The invention also refers to a pressurized container having said replaceable ring elements.

8 Claims, 8 Drawing Sheets

(52) U.S. Cl.
CPC .. *F17C 2205/0165* (2013.01); *F17C 2205/052* (2013.01); *F17C 2221/011* (2013.01); *F17C 2221/018* (2013.01); *F17C 2221/035* (2013.01); *F17C 2223/0123* (2013.01); *F17C 2223/0153* (2013.01); *F17C 2223/033* (2013.01); *F17C 2223/035* (2013.01); *F17C 2260/012* (2013.01); *F17C 2260/015* (2013.01); *F17C 2260/048* (2013.01); *F17C 2260/053* (2013.01); *F17C 2270/05* (2013.01); *F17C 2270/0545* (2013.01); *F17C 2270/07* (2013.01); *F17C 2270/0745* (2013.01); *Y10T 29/49009* (2015.01); *Y10T 428/24322* (2015.01)

(56) References Cited

U.S. PATENT DOCUMENTS

| | | | | |
|---|---|---|---|---|
| 6,662,963 | B1* | 12/2003 | Meike | B65D 7/045 206/821 |
| 7,131,618 | B2* | 11/2006 | Berry | F17C 13/084 248/310 |
| 7,699,188 | B2* | 4/2010 | Oliveira | F17C 13/00 220/586 |
| 2002/0121583 | A1* | 9/2002 | Jones | E01C 5/223 248/346.01 |
| 2009/0114637 | A1* | 5/2009 | Ireman | A47J 27/21066 219/441 |
| 2010/0116836 | A1* | 5/2010 | Kolon | B65D 25/2826 220/759 |
| 2010/0147859 | A1* | 6/2010 | Chohfi | F17C 1/14 220/581 |
| 2011/0140412 | A1* | 6/2011 | Manser | F17C 13/084 258/192 |
| 2012/0118902 | A1* | 5/2012 | Beltrante | A47G 23/0208 220/737 |

FOREIGN PATENT DOCUMENTS

| | | |
|---|---|---|
| FR | 2829558 A1 | 3/2003 |
| GB | 2001032 A | 1/1979 |

* cited by examiner

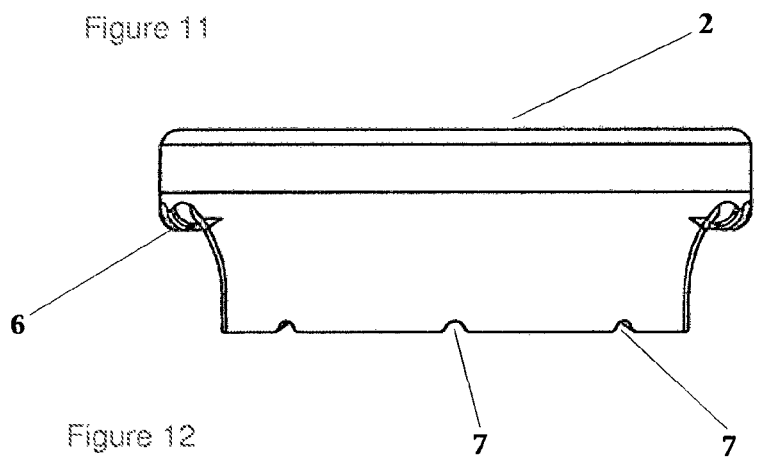
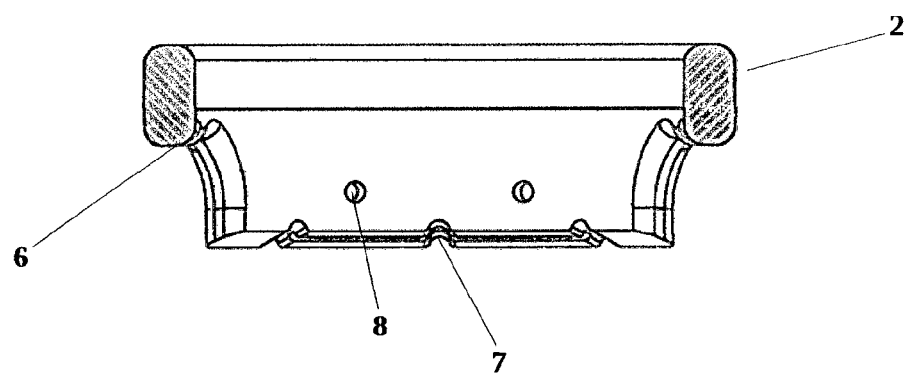
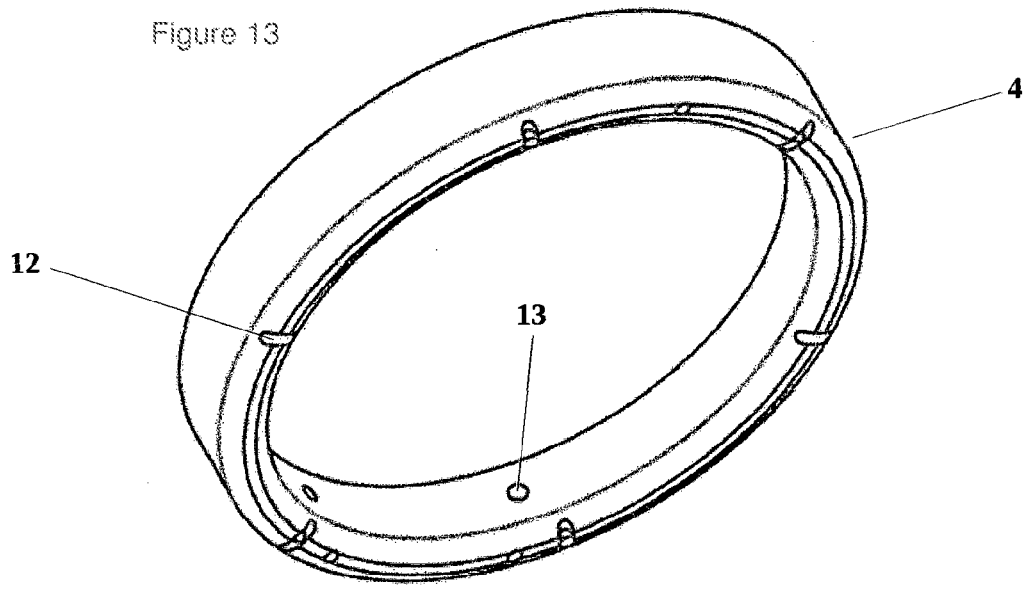

REPLACEABLE ASSEMBLY FOR A PRESSURIZED CONTAINER

FIELD OF THE INVENTION

The present invention generally refers to pressurized containers and, more specifically, to a set of replaceable upper or handle ring and lower or support/base ring elements made from a thermostable material, a thermosetting material or a combination thereof for use with a pressurized container.

BACKGROUND OF THE INVENTION

As it is known by persons those skilled in the art, the pressurized containers used in the state of the art for LPG bottles for domestic and industrial use, oxygen cylinders, gas cylinders employed in soldering processes and other pressurized vessels and/or containers, are integrally made from a metallic material.

Typically, said pressurized containers or bottles are manufactured from two end sections formed from metallic (generally steel) plates, rounded up in plate rolls or stamped in large capacity presses to a generally tubular or similar format, having a closed end and an open end, which sections are soldered to each other along the edges of their open ends to form a closed body or housing.

A first ring-shaped element is soldered to the upper half of said pressurized containers to provide a handle portion and a second ring-shaped element is soldered to the bottom half of the container to define a support or base portion of the container.

Additionally, said pressurized containers are also provided with a seat portion centrally positioned in its upper half, said seat portion having an inner thread for receiving the outer thread of a valve element that connects and controls the flow of gas between the container and a device where said gas is used, said seat portion also being mounted to the body of said container by soldering.

A problem of the pressurized containers known in the state of the art are the damages they withstand from shocks and impacts they suffer while being handled for loading and unloading from trucks, stacking for storage and/or during the procedure of being reloaded or refueled with gas. In other words, in a number of situation while being used these pressurized containers may suffer impacts which can reduce its lifetime and/or increase the maintenance cost.

This condition is particularly aggravated when the upper or handle ring and/or the lower or support/base ring elements, mainly the latter, which suffers more impacts when of the loading and unloading of the container for transportation and stacking for storage, need to be replaced.

More specifically, the replacement of the upper or handle ring and/or of the lower or support/base ring elements demands their wearing and tearing as well as the rupture of the soldering points through which they are mounted to the container, the priming of the points of the surface of the container where said upper or handle and lower or support/base ring elements were mounted and, following that, the soldering of new upper or handle ring and/or of the lower or support/base ring elements.

Each one of the above steps means submitting the material of the pressurized container to successive heating and cooling cycles, which with time compromise the integrity of the metallic structure of the pressurized container.

The replacement of the upper or handle ring and the lower or support/base ring elements, in addition from being extremely labor intensive, reduces the useful lifetime of the containers due to the heating and cooling cycles to which they are submitted. Furthermore, the cost of repairing the containers is substantially high and, accordingly, the cost-benefit ratio of the operation is not profitable.

In addition to the above, the frequent replacement of the upper or handle ring and/or of the lower or support/base ring elements means a significant increase of the total costs involved in the maintenance of the pressurized containers used by the industries that commercialize LPG and other pressurized gases, a factor that limits the profit of these business due to the fact that often these costs cannot be passed on to the consumers because generally speaking LPG and other gases normally have their prices controlled by the government.

In addition to the above-mentioned problems and disadvantages, as said upper or handle ring and/or said lower or support/base ring elements, as well as the structure of the pressurized containers are manufactured from steel, this fact implicates in that said rings and containers being frequently painted, a finishing touch which is not entirely efficient with regards to resistance to damage and/or wear and tear.

From the above, it is easy for a person skilled in the art to realize that said upper or handle ring and/or said lower or support/base ring elements are subjected to wear and tear which increases the risk of corrosion, particularly when the layer of paint that covers them is damaged.

SUMMARY OF THE INVENTION

The present invention was developed with the above problems and disadvantages regarding the pressurized containers well known in the state of the art in mind, to provide a solution for said problems.

Therefore, it is an objective of the present invention to provide an assembly of upper or handle and/or lower or support/base ring elements for a pressurized container wherein the replacement of the upper or handle ring and/or lower or support/base ring elements is a an operation simple and easy to accomplish.

Another objective of the present invention is to provide an assembly of upper or handle and/or lower or support/base ring elements for a pressurized container wherein the replacement of the ring elements does not compromise the integrity of the metallic structure of the pressurized container, which material is not submitted to successive heating and cooling cycles.

Another objective of the present invention is to provide an assembly of upper or handle and/or lower or support/base ring elements for a pressurized container wherein the replacement of the ring elements does not imply in reducing the useful lifetime of the container.

Another objective of the present invention is to provide an assembly of upper or handle and/or lower or support/base ring elements for a pressurized container wherein the replacement of the ring elements has significantly reduced operational cost and an excellent cost/benefit correlation.

Another objective of the invention is to provide an assembly of upper or handle and/or lower or support/base ring elements for a pressurized container which are resistant to corrosion and significantly reduce the weight of the container.

According to the invention these objectives are carried out by an assembly of replaceable upper or handle and/or lower or support/base ring elements for a pressurized container having an upper portion and a lower portion, said ring elements comprising an upper ring element defining a handle portion for the container and a lower ring element defining a support/base portion for the container, said upper and lower rings elements being manufactured from a synthetic material and having fastening means for releasably attaching said upper and lower rings elements to projections provided in the upper and lower portions of said pressurized container.

The invention also refers to a pressurized container wherein said upper or handle and lower or base ring elements are manufactured from a synthetic material and are pressure-fitted over projections provided on the top and bottom portions of said container.

BRIEF DESCRIPTION OF THE DRAWINGS

The present invention will be further described in greater detail with reference to an exemplified, non-limiting embodiment which is illustrated in the attached drawings, wherein:

FIG. 11 is an additional elevation view of the upper or handle ring element;

FIG. 12 is an additional elevation view, partially in section, of the upper or handle ring element detailing its inner parts;

FIG. 13 is a perspective view of the lower or support/base ring element according to the present invention;

DETAILED DESCRIPTION OF THE PREFERRED EMBODIMENT

A specific and currently preferred embodiment of the present invention is hereby illustrated as a non-limiting example in the attached drawings and will be described in greater detail hereinafter. Nevertheless, it is to be understood that while the present invention is susceptible to a number of modifications and adaptations with respect to its form and dimensions, the present specification does not intend to limit the invention to the particular form and/or dimensions described but, on the contrary, it intends to cover all such modifications and alternative embodiments which fall within the spirit and the scope of the invention as defined in the attached claims.

Figure 1:
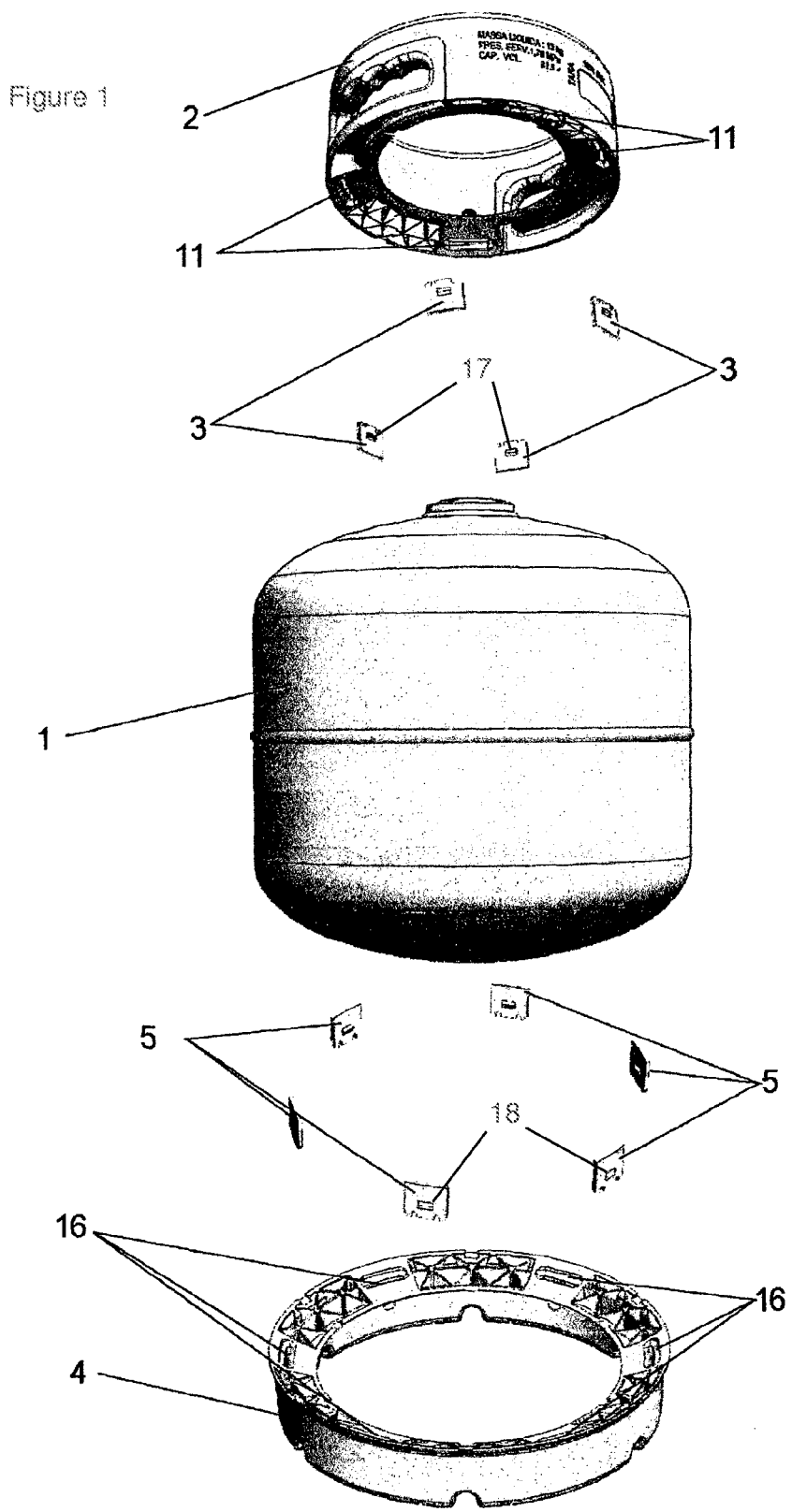
FIG. 1 is a perspective view of the assembly of upper or handle and/or lower or support/base ring elements for a pressurized container according to the present invention.

With particular reference the drawings, FIG. 1 is a perspective view of the replaceable upper or handle and lower or support/base ring elements 2, 3 according to the present invention for use with a pressurized container 1.

The pressurized container 1 is provided with a pair of projections 3, 5, soldered or in any other manner affixed to its upper and lower portions where said upper or handle ring element 2 and said lower or support/base ring element 4 can engage through slots 11, 16 formed therein.

Said upper or handle ring element 2 and said lower or support/base ring element 4 are manufactured, preferably by injection-molding from an adequate synthetic plastic material. Said synthetic plastic material, preferably, but not exclusively, is a high density polyurethane molded by injection reaction.

Figure 2:
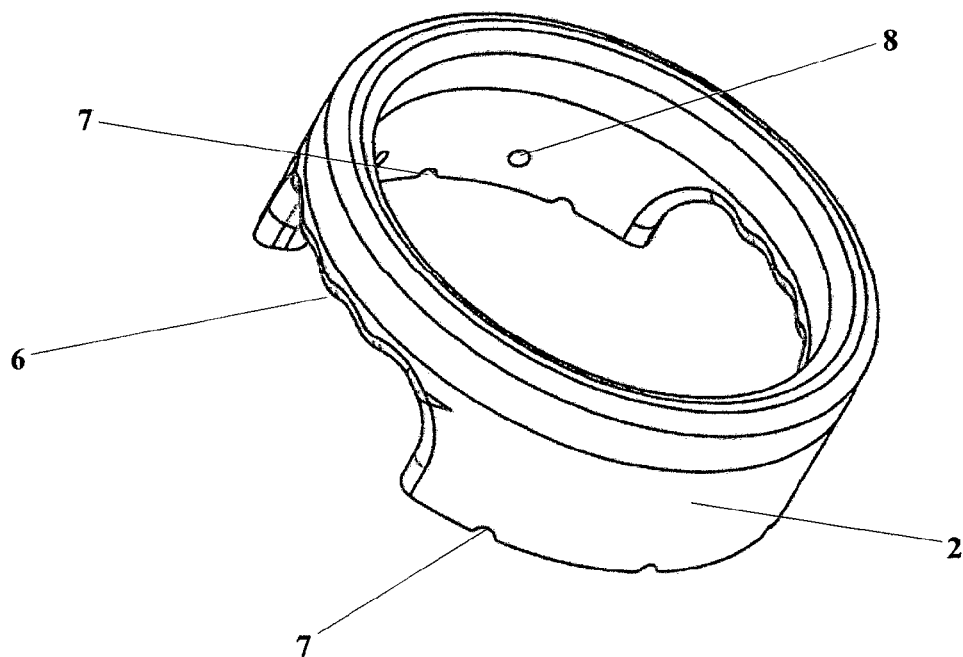
FIGS. 2 and 3 are perspective views of the upper or handle ring element according to the present invention.
Figure 3:
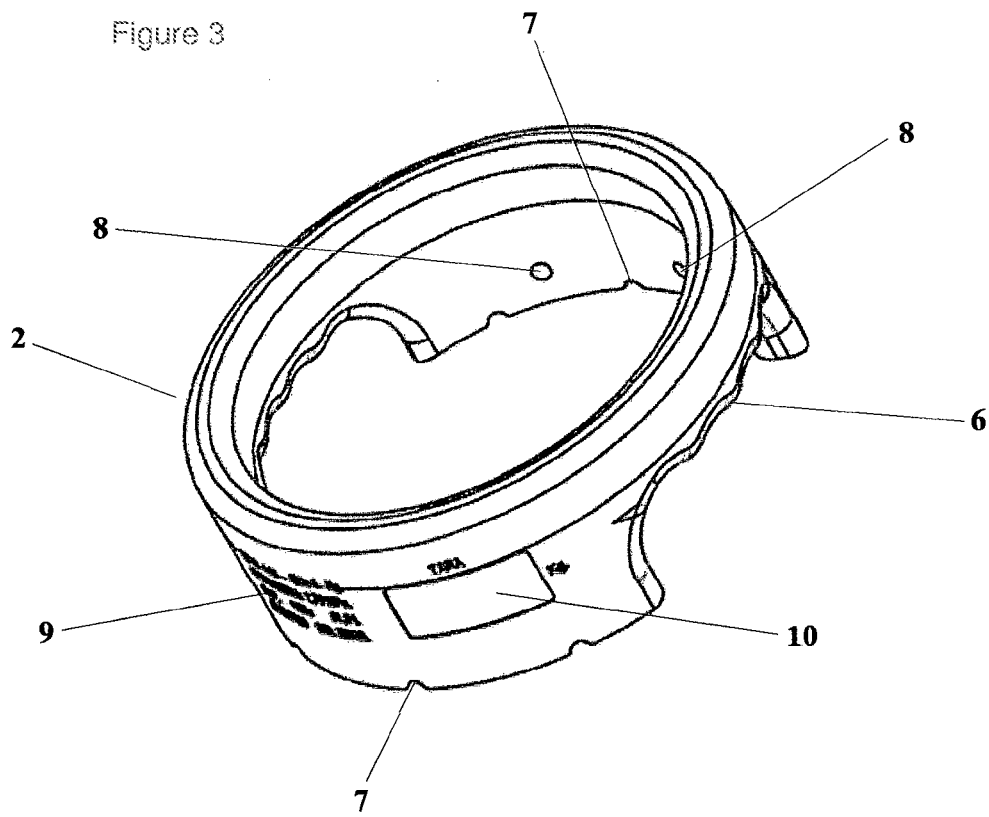

FIGS. 2 and 3 are perspective views of the upper or handle ring element 2 according to the present invention which illustrate in detail the ergonomic conformation of the holding portion 6 of said upper or handle ring element 2, as well as the recessed portions 7 formed on its edge contacting the pressurized container, which recessed portions 7 allow for the draining of water or any other liquids that may fall over upon the container, and the apertures 8 that allow for the unlocking of the upper or handle ring element 2 from the projections 3 on the upper portion of the body 1 of the pressurized container.

Figure 4:
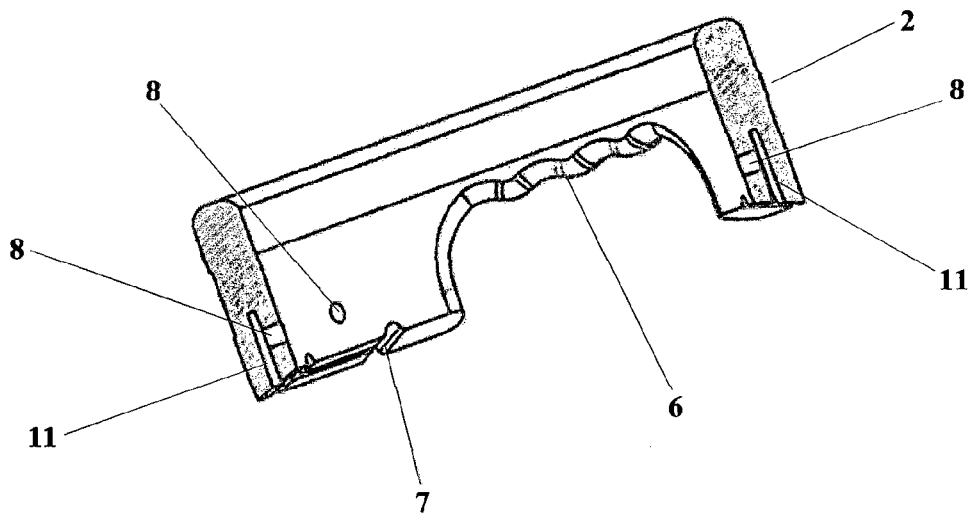
FIGS. 4 and 5 are additional perspective views, partially in section, of the upper or handle ring element.
Figure 5:
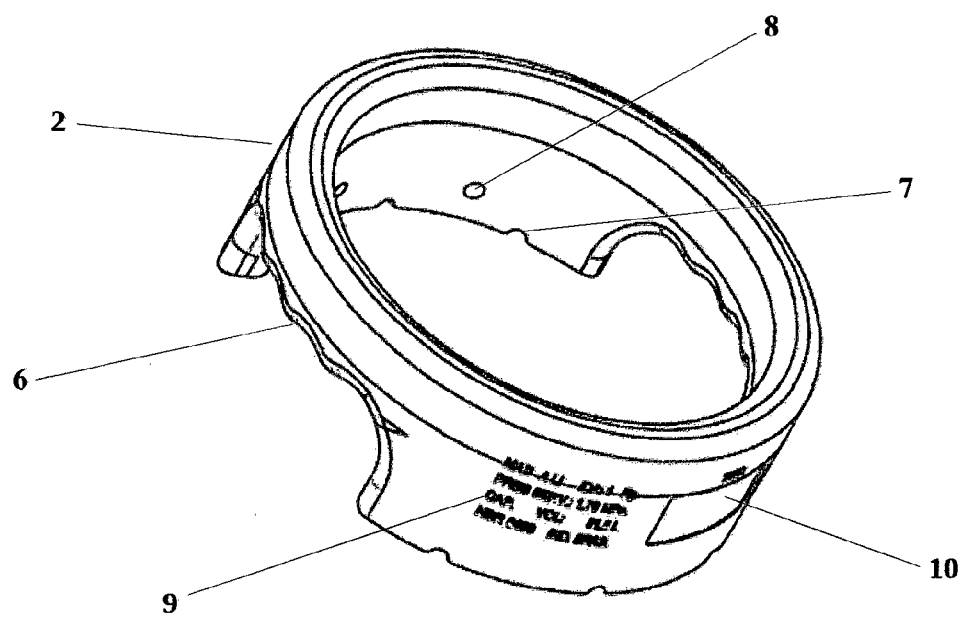

FIGS. 4 and 5 are top perspective views, partially in section, of the upper or handle ring element 2 illustrating two areas 9, 10 specially formed on the external side wall of the upper or handle ring element 2. A first area 9 to receive a label or similar containing technical data and a second area 10 to receive a second label containing data related to the weighing control of the pressurized container 1.

Additionally, FIG. 4 provides a view of the inner details of the slot 11 used to fit and engage the upper or handle ring element 2 over the projections 3 provided on the upper portion of the pressurized container 1, and the apertures 8 that allow for the unlocking of the upper or handle ring element 2 from the projections 3 on the upper portion of the body 1 of the pressurized container, where it is locked in position by means of hook-locking elements 17 formed in the projections 3.

Figure 6:
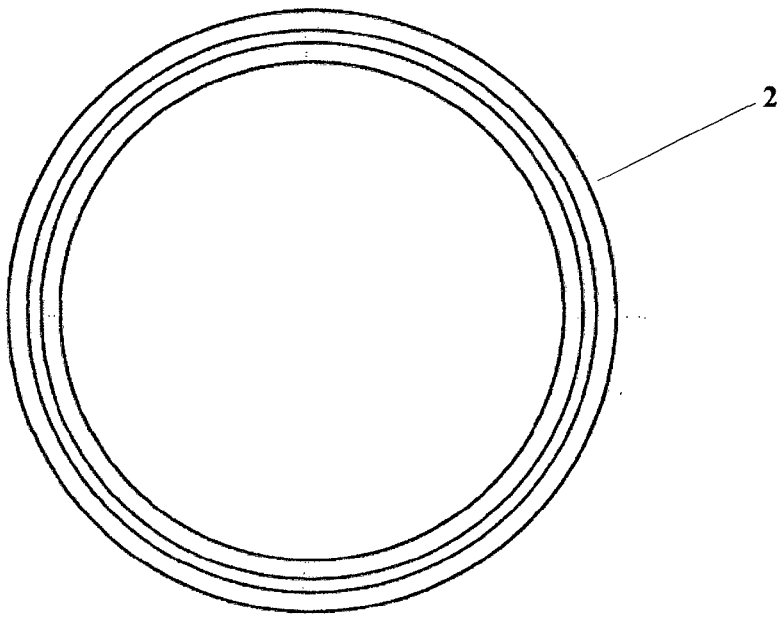
FIG. 6 is a superior plan view of the upper or handle ring element.
Figure 7:
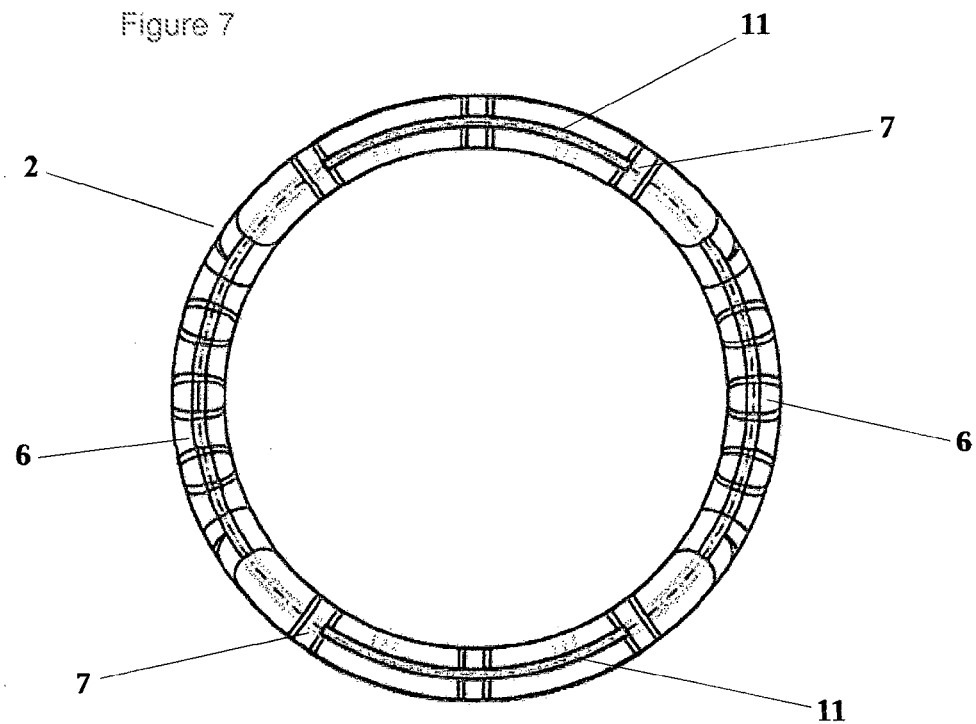
FIG. 7 is an inferior plan view of the lower part of the upper or handle ring element.
Figure 8:
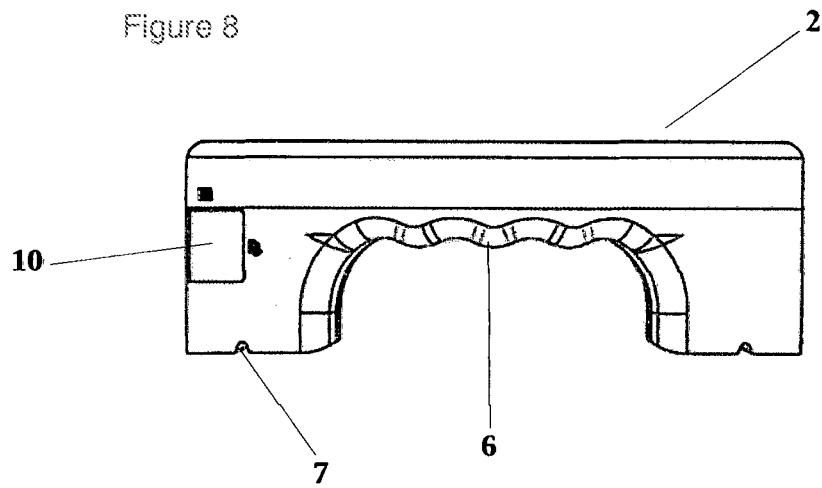
FIGS. 8 and 9 are elevation views of the upper or handle ring element.
Figure 9:
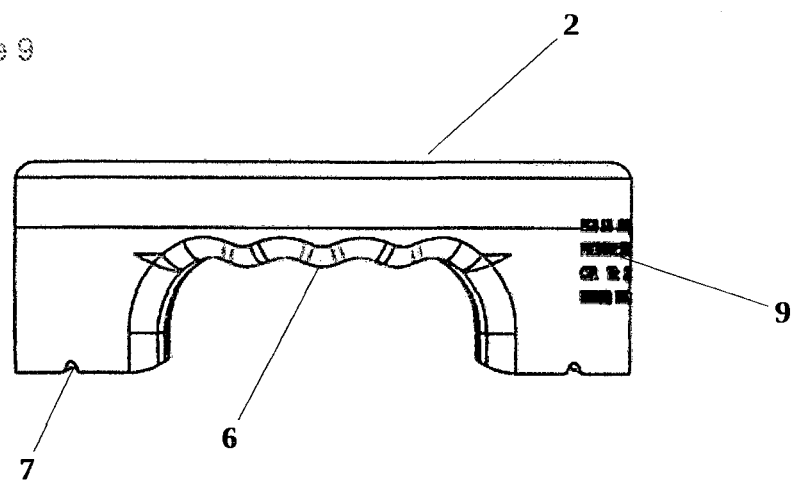
Figure 10:
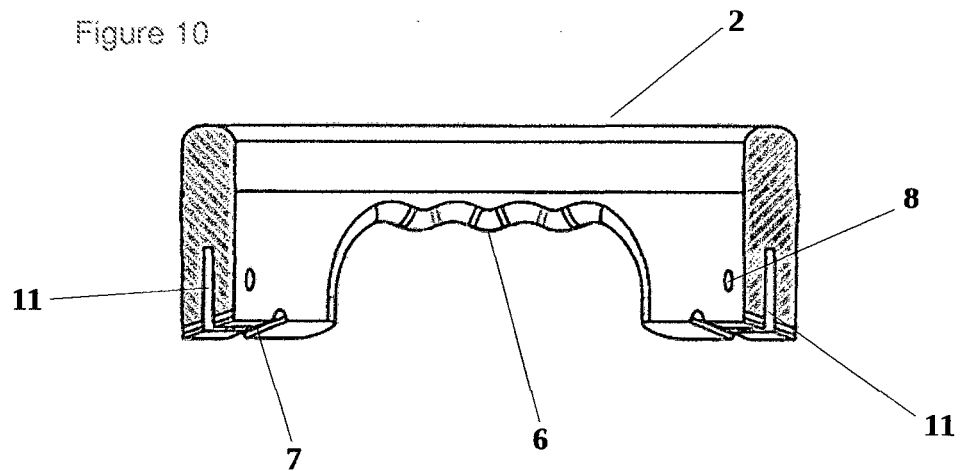
FIG. 10 is an elevation view partially in section of the upper or handle ring element detailing its inner parts.

FIGS. 6 and 7 show top and a bottom plan views of the above-described constructing details relative to the upper or handle ring element 2.

FIGS. 8 to 12 are elevation views of said upper or handle ring element 2 that provide a closer look of the above-described constructing details to facilitate understanding.

FIG. 13 is a perspective view of the lower or support/base ring element 4 according to the present invention, showing six recessed portions 12 evenly distributed along its lower edge to allow the draining of liquids and inner apertures 13 that allow for the unlocking of the lower or support/base ring element 4 from the projections 5 on the lower portion of the body 1 of the pressurized container, where it locks over hook-locking elements 18 formed in said projections 5.

Figure 14:
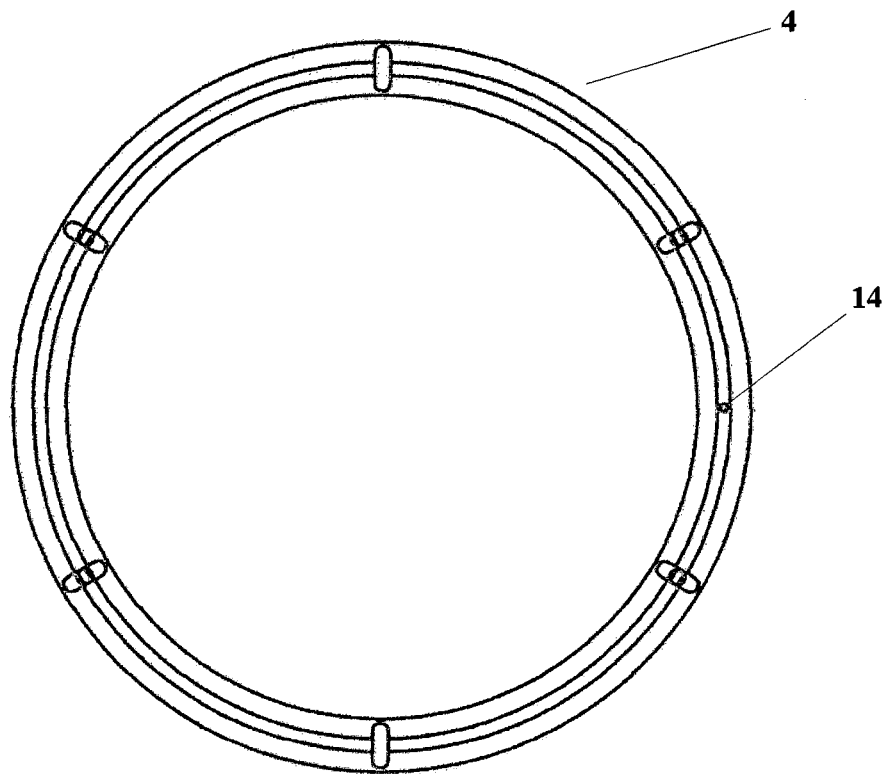
FIG. 14 is an inferior plan view of the lower or support/base ring element.
Figure 15:
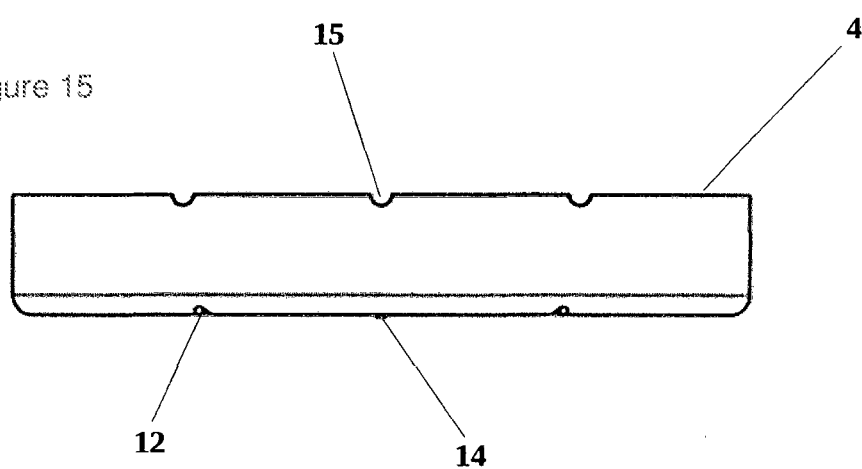
FIG. 15 is an elevation view of the lower or support/base ring element.

FIG. 14 is a bottom plan view of the lower and support/base ring element 4 showing the aperture for receiving an earth pin 14, which is kept in contact with the body 1 of the pressurized container in order to divert and unload any static loads that might have been accumulated over the pressurized container onto the soil.

Additionally, FIG. 4 illustrate inverted draining recessed portions 15 formed on the edge of the edge of the lower or support/base ring 4 contacting the pressurized container, which recessed portions 15 allow for the draining of water or any other liquids that may fall over upon the container 1.

Figure 16:
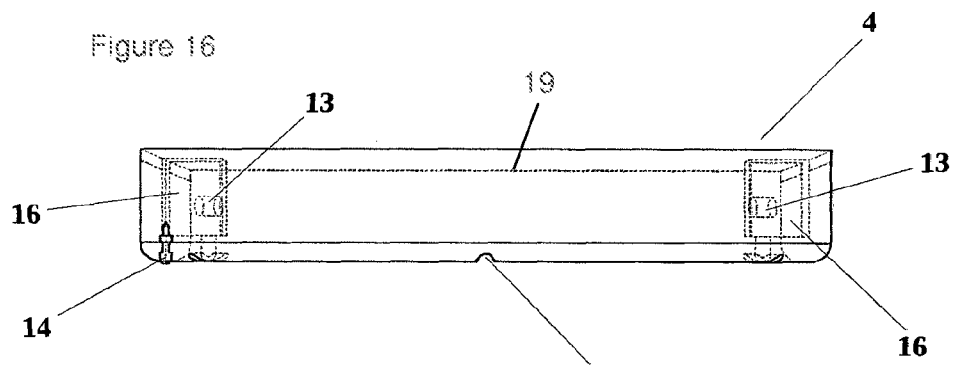
FIGS. 16 and 17 are diametrically opposed partially traced superior views of the lower or support/base ring element detailing its inner parts.
Figure 17:
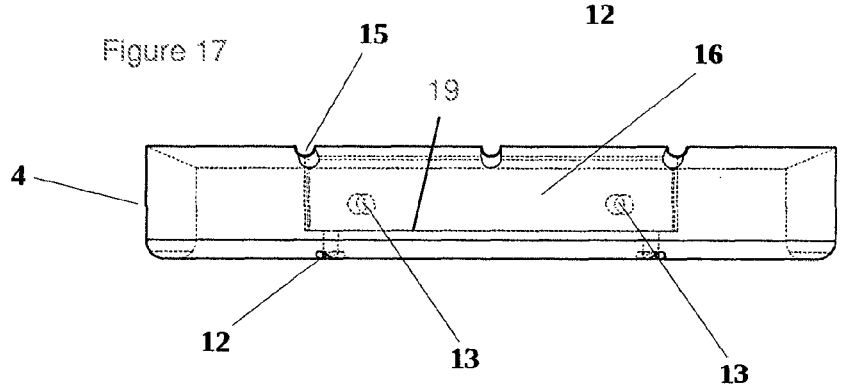

FIGS. 16 and 17 are diametrically opposed superior views, partially traced, of the lower or support/base ring element 4 illustrating the inner details of slot 16 used to fit and engage the lower or support/base ring 4 over the projections 5 provided on the lower portion of the pressurized container 1, and the apertures 13 that allow for the unlocking of the lower or support/base ring 4 from said projections 5 on the lower portion of the body 1 of the pressurized container, where it is locked in position by means of hook-locking elements 18 formed in the projections 3. FIGS. 16 and 17 show an inner stop 19 for receiving a locking end of a hook-locking elements 17, 18 formed on the projections 3, 5, respectively.

The earth pin 14 is lower and vertically disposed in a through orifice with regards to slot 16 in order to create a contact between the projection 5 in the bottom part of the body 1 of the pressurized container and the soil.

Figure 18:
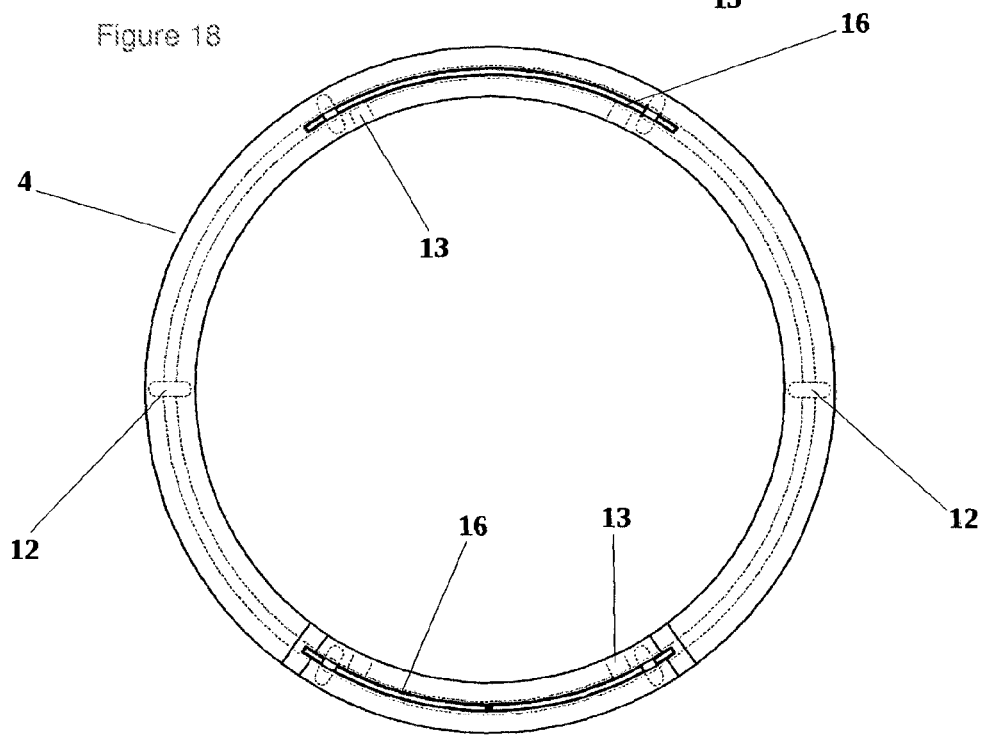
FIG. 18 is a superior plan view of the lower or support/base ring element.

FIG. 18 is a superior plan view of the lower or support/base ring element 4 that provide a closer view of the above-described constructive details to facilitate understanding.

The replacement of the upper or handle ring and of the lower or support/base ring elements manufactured from a synthetic plastic material such as polyurethane according to the present invention is a simple and easy operation. All that it is necessary is to introduce the tip of a tool such as a screw driver through apertures 8, 13 to cause the ring elements to disengage from the hook-locking elements 17, 18 and the ring elements can be easily removed from the container and replaced by new ones whenever necessary.

Accordingly, the replacement of the upper or handle ring and of the lower or support/base ring elements manufactured from a synthetic plastic material such as polyurethane according to, the present invention does not submit the container to heating and cooling cycles and/or to any other particular treatment.

Furthermore, the replacement of the upper or handle ring and of the lower or support/base ring elements manufactured from a synthetic plastic material such as polyurethane according to the present invention does not compromise the integrity of the metal structure of the pressurized container.

Additionally, the use of the upper or handle ring and of the lower or support/base ring elements manufactured from a synthetic plastic material such as polyurethane according to the present invention provides the advantage of not compromising the useful lifetime of the container.

The use of the upper or handle ring and of the lower or support/base ring elements manufactured from a synthetic plastic material such as polyurethane according to the present invention is an economic solution, which avoids material wastage due to the factor that it allows for recycling and reuse of the present pressurized containers, which indeed proved to be safe and functional.

Having described and illustrated the preferred embodiment currently contemplated to carry out the present invention, a variety of modifications and variations in its form of embodiment will be readily apparent to those individuals skilled in the art. Therefore it must be understood that the present invention is not limited to the practical aspects of the embodiment currently preferred, illustrated and described, and that all such modifications and variations must be considered as being within the spirit and the scope of the invention, such as it is defined in the annexed claims.

The invention claimed is:

1. A replaceable assembly for a pressurized container, comprising a body with an upper portion and a lower portion, and the replaceable assembly comprising an upper handle ring element and a lower support ring element, each ring elements comprising an upper ring element defining a handle portion for the container and a lower ring element defining a support portion for the container, wherein said upper handle and lower support ring elements are manufactured from a thermostable material, a thermosetting material or a combination thereof and comprise fastening elements to releasably engage the ring elements with projections provided on the upper and lower portions of said pressurized container, and wherein said fastening elements comprise openings formed in edges of the upper handle ring element and a lower support ring element facing a surface of said container that allow the upper handle ring element and a lower support ring element to slide over projections provided on the upper and lower portions of said pressurized container, each of said openings having an inner stop for receiving a locking end of a hook-locking element formed on said projections.

2. The replaceable assembly of claim 1, wherein said openings have side apertures that allow for the unlocking of the inner stops from the locking end of the hook-locking element formed on said projections.

3. The replaceable assembly of claim 2, wherein said openings are longitudinal slots formed on the upper handle ring element and a lower support ring element.

4. The replaceable assembly of claim 1, wherein the upper handle ring element and a lower support ring element have recessed portions on edges contacting the pressurized container to allow for the draining of water or any other liquids that may fall over upon the container.

5. The replaceable assembly of claim 1, wherein the upper handle ring element and a lower support ring element are provided with two external side areas to receive labels identifying technical data of the container.

6. The replaceable assembly of claim 1, wherein said lower or support/base ring element is formed with an earth pin to connect the pressurized container to a grounding surface.

7. The replaceable assembly of claim 1, wherein said container is a LPG gas container for domestic or industrial use, an oxygen cylinder, a cylinder for gases employed in soldering processes or other pressurized container.

8. A pressurized container comprising a body having an upper portion and a lower portion and a replaceable upper handle ring element and a replaceable lower support ring element manufactured from a synthetic material and having fastening elements to releasably engage with projections provided on the upper and lower portions of said pressurized container, wherein said fastening elements comprise openings formed in edges of the handle ring element and a replaceable lower support ring element facing a surface of said container that allow the handle ring element and a replaceable lower support ring element to slide over projections provided on the upper and lower portions of said pressurized container, each of said openings having an inner stop for receiving a locking end of a hook-locking element formed on said projections.

* * * * *